W. G. KERR.
SAW JOINTER AND SHARPENER.
APPLICATION FILED MAR. 2, 1912.

1,049,870.

Patented Jan. 7, 1913.
2 SHEETS—SHEET 1.

Witnesses
J. L. Wright
V. B. Hillyard.

Inventor
William G. Kerr,
By Victor J. Evans,
Attorney

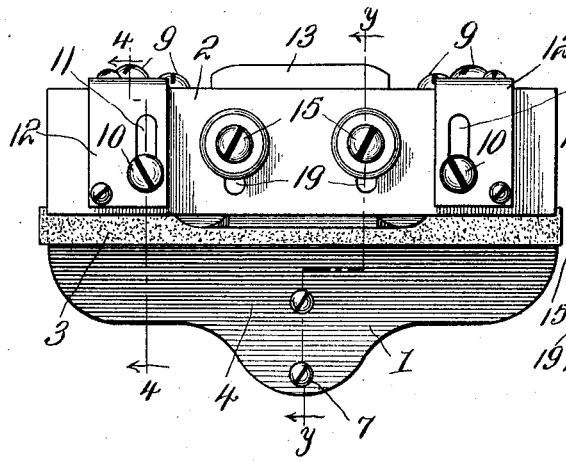
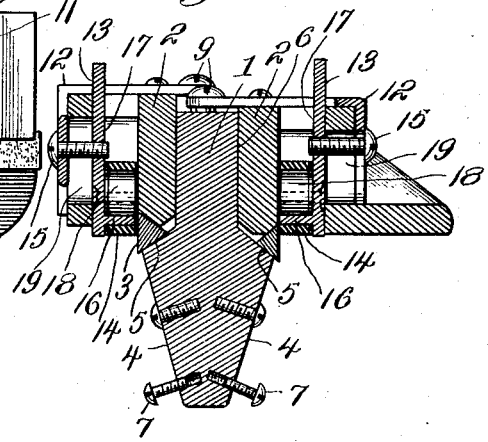
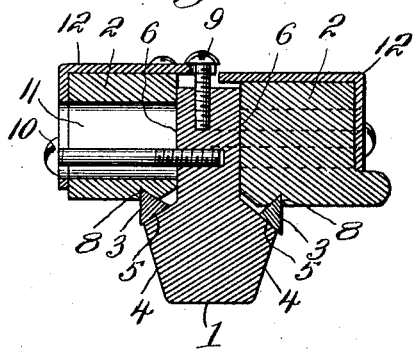
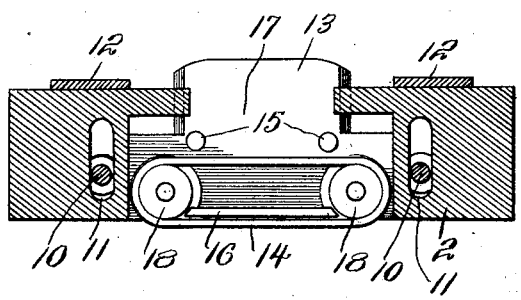

UNITED STATES PATENT OFFICE.

WILLIAM G. KERR, OF MEMPHIS, TENNESSEE.

SAW JOINTER AND SHARPENER.

1,049,870.  Specification of Letters Patent.  Patented Jan. 7, 1913.

Application filed March 2, 1912. Serial No. 681,146.

*To all whom it may concern:*

Be it known that I, WILLIAM G. KERR, a citizen of the United States, residing at Memphis, in the county of Shelby and State of Tennessee, have invented new and useful Improvements in Saw Jointers and Sharpeners, of which the following is a specification.

The present invention supplies a tool for sharpening and jointing saws, which is adjustable and adapted to admit of the required work being performed in a rapid and effective manner, the tool embodying a minimum number of parts and capable of being separated for any purpose and adapted to be easily assembled.

The invention consists of the novel features, details of construction and combination of parts, which hereinafter will be more particularly set forth, illustrated in the accompanying drawings, and pointed out in the appended claims.

Figure 1:
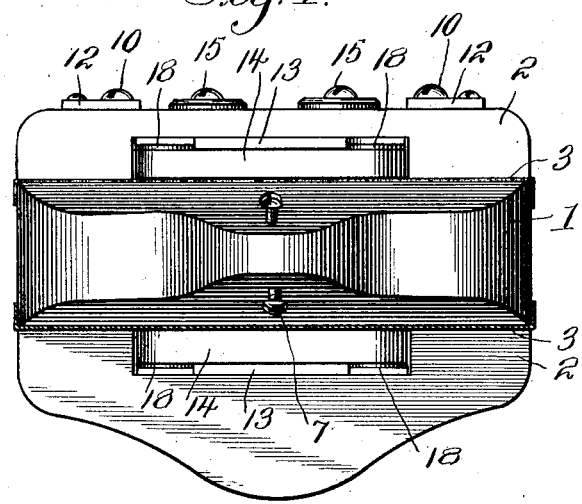
Figure 7:
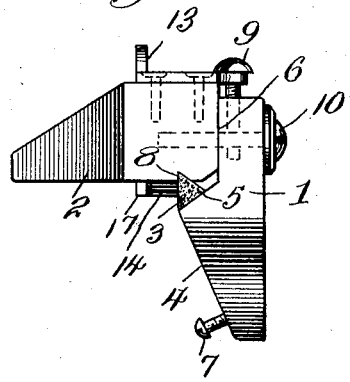
Figure 2:
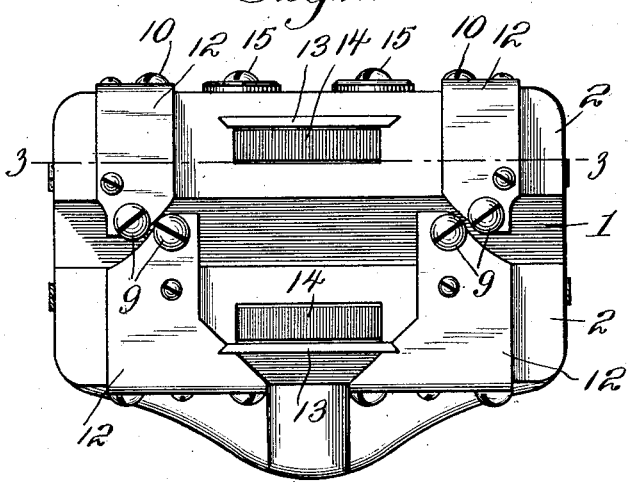
Figure 8:
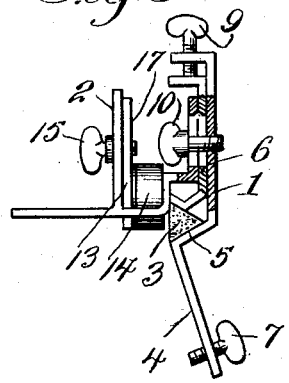

Referring to the drawings, forming a part of the specification, Figure 1 is a front view of a tool embodying the invention. Fig. 2 is a rear view thereof. Fig. 3 is a top view. Fig. 4 is a section on the line 4—4 of Fig. 3. Fig. 5 is a section on the line $y$—$y$ of Fig. 3. Fig. 6 is a section on the line $z$—$z$ of Fig. 2. Fig. 7 is an end view of a modification. Fig. 8 is an end view of a further modification.

Corresponding and like parts are referred to in the following description, and indicated in all the views of the drawings, by the same reference characters.

The tool comprises essentially three members, two of the members having the file or like abrading or sharpening tool clamped between them and the third member being provided with an endless guard, which protects the points of the teeth during the sharpening of the saw. The main member 1 is relatively fixed, whereas the member 2 is adjustable. The file 3 is clamped between the members 1 and 2 and may be of metal or other material and has a plurality of faces any one of which may be brought into working position. The file is preferably triangular in cross section and has three adjustments so that any one of the three faces may be brought into position either for jointing or sharpening the saw. The main or fixed member 1 has three faces 4, 5 and 6. The face 4 slants, whereas the face 6 is vertical and the face 5 inclines in an opposite direction to the slant of the face 4, the inclination coinciding with the relative slant of a side of the file 3. When the file is in place its working face is in a plane parallel with the plane of the face 6. A support 7 is located upon the outer portion of the slanting face 4 and is adjustable, being preferably a set screw. The support 7 determines the relative position of the saw blade when sharpening the same.

The member 2 is adjustable on the face 6 of the member 1 and has a groove 8 which receives an edge of the file 3, one face of the groove being straight and the other face inclined. The inner lower corner of the member 2 is cut away so as not to interfere with inward movement of the member 2 when clamping the file 3. Set screws 9 serve to adjustably connect the member 2 to the member 1 and other screws 10 secure the member 2 after the same has been properly adjusted. The screws 10 operate in slots 11 formed in the member 2, thereby admitting of adjustment of the member 2 on the member 1 to clamp or release the file 3. In the construction shown in Fig. 1 and the detail views thereof and in the modification illustrated in Fig. 7 the members 1 and 2 are constructed of wood and in order that the set screws 9 and 10 may operate successfully the member 2 has angle pieces 12 of metal fitted thereto. An arm of each angle piece 12 is extended so as to overlap the member 1 and receive the set screws 9 and the other arm is slotted to receive the screws 10. When the tool is to be used for jointing the teeth of saws the saw blade is placed against the inner face of the member 2 with the points of its teeth in contact with the file 3, after which the tool is moved upon the saw blade one or more times until the teeth project to a substantially straight line touching the extremities thereof. When one face of the file becomes dulled the member 2 may be loosened and moved so as to release the file when the latter may be adjusted to bring another face or a new portion of the same face in working position, after which the member 2 is adjusted so as to clamp the file, said member when adjusted being made secure by tightening the screws 10.

The guide is adjustable on the member 2 so as to project beyond the face thereof to overlap the working face of the file 3 a greater or less distance according to the length of the saw teeth to be sharpened.

The guide comprising a frame 13 and an endless guard 14 mounted thereon. The guide operates through an opening formed in the front face of the member 2 and is adapted to be secured to said member in the required adjusted position by means of set screws 15. The frame 13 has two parts 16 and 17, the latter being parallel with the face 6 of the member 1 and the part 16 being parallel from the part 17 and are located at opposite ends of the frame. The endless guard 14 is mounted upon the pulleys 18 and its outer portion is supported by the part 17, which forms a backing therefor. An edge portion of the part 17 overhangs the part 16 and holds the endless guard in proper position. The front portion of each of the pulleys 18 is in line with the front of the part 16, thereby holding the outer portion of the endless guard in position to engage with the points of the saw teeth directly opposite the guard. The endless guard 14 may be of leather or other material which will prevent dulling the points of the saw teeth when sharpening the same.

The guide is held in the required position by means of the set screws 15, which pass through transverse slots 19 formed in the member 2 and which have their inner ends threaded into openings of the part 17. In the forms shown in Figs. 1 and 7 the member 2 has a mortise formed therein to receive the part 17 of the frame, said part projecting beyond the rear or outer side of the member 2 and adapted to engage with parts of the angle pieces 12, which latter prevent undue wear upon the wooden member 2 when adjusting the guide. When jointing a saw the guide is moved so as to withdraw the outer portion of the endless guard within the plane of the front of the member 2, but when sharpening the saw the guide is adjusted so that a portion of the teeth of the saw may overlap the outer portion of the file 3 a distance corresponding to the part of the teeth to be sharpened. The points of the saw teeth engage with the outer portion of the guard 14 and when moving the tool upon the saw blade the guard 14 is caused to travel on the pulleys 18. The slant of the saw with reference to the face 4 may be regulated by adjustment of the support or set screw 7.

In the modification shown in Fig. 8 the several parts, that is the members 1 and 2 and the frame of the guide are constructed of metal pressed or bent into the form substantially as indicated, said construction being light and overcoming the necessity for reinforcing parts, such as the angle pieces 12, made necessary by the forms illustrated in Figs. 1 and 7.

The form of tool illustrated in Fig. 1 and in the detail views thereof is double, that is it comprises a centrally disposed member 1 and two adjustable members 2, each of the adjustable members being secured to the main or fixed member 1 in substantially the same manner and each adjustable member being provided with a guide and having a file clamped between it and the intermediate portion 5 of the main member. In this form of tool a coarse file and a fine file may be placed in position and one of the guides may be moved within the plane of the front of the adjustable member and the other guide adjusted to overlap the file the required distance, thereby admitting of one part of the tool being used for jointing a saw and the other part for sharpening a saw, thereby avoiding the necessity for adjusting the guide to sharpen the saw after the same has been jointed, filed and set. The adjustable stop or support 9 may be set so that the sides of the teeth may be filed to any angle and when a saw becomes dulled the stop or support 9 may be moved outward slightly so that the teeth of the saw may be filed at a less angle, thereby sharpening the saw without necessitating the cross filing thereof. In the modifications shown in Figs. 7 and 8 the tool comprises two members and one file, hence the guide must be adjusted so as to be moved out of the way when jointing the saw and to be projected to the proper position when sharpening the saw.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A tool for sharpening saws comprising angularly disposed members, a file located in the angle formed between the members, and a guide adapted to engage the points of the saw teeth and movable therewith, said guide being of yieldable material and arranged in a plane at a right angle to the working face of the file.

2. A saw sharpener comprising two members having angularly disposed faces, a file located in the angle formed between the two faces of the members, a guide adjustable upon one of the said members to overlap the working faces of the file a greater or less distance, said guide comprising a frame, and a guard of yieldable material mounted upon the frame.

3. A saw sharpener comprising two members having angularly disposed faces, a file located in the angle formed between the two faces of the members, a guide adjustable upon one of the said members to overlap the working face of the file a greater or less distance, said guide comprising a frame, and an endless guard mounted upon the frame.

4. A saw sharpener comprising two members having angularly disposed faces, a file located in the angle formed between the two members, a frame adjustable upon one of the members to project over the working face of the file a greater or less distance, pulleys at the ends of the frame, an endless guard mounted upon the pulleys and supported intermediate of the pulleys, and means for securing the frame to one of the members in the adjusted position.

5. A saw sharpener comprising two members having angularly disposed faces, one of the members having a mortise, a file secured between the members and located at the angle formed between the angularly disposed faces thereof, a frame adjustable in the mortise and adapted to overlap the working face of the file a greater or less distance, pulleys at the ends of the frame, an endless guard supported upon the pulleys and intermediate of the pulleys by a portion of the frame, and means for securing the frame in the adjusted position.

In testimony whereof I affix my signature in presence of two witnesses.

WILLIAM G. KERR.

Witnesses:
R. E. HUNTER,
ALBERT P. COLBY.